July 15, 1924.

P. KILIMNIK

RAZOR BLADE HOLDER

Filed Feb. 26, 1924

1,501,783

WITNESSES

INVENTOR
Philip Kilimnik
BY

ATTORNEYS

Patented July 15, 1924.

1,501,783

UNITED STATES PATENT OFFICE.

PHILIP KILIMNIK, OF NEW YORK, N. Y.

RAZOR-BLADE HOLDER.

Application filed February 26, 1924. Serial No. 695,370.

*To all whom it may concern:*

Be it known that I, PHILIP KILIMNIK, a citizen of the United States, and a resident of the city of New York, borough of Queens, in the county of Queens and State of New York, have invented a new and Improved Razor-Blade Holder, of which the following is a full, clear, and exact description.

This invention relates to a razor blade holder, and has for an object the provision of means whereby a razor blade, preferably of the Gillette type, may be quickly and easily gripped by said device and as easily removed therefrom for the purpose of sharpening it.

Another object concerns the provision of a device which is formed of a minimum number of simple, strong parts compactly assembled and capable of operation in a very simple manner.

The invention is illustrated in the drawings, of which—

Figure 1:
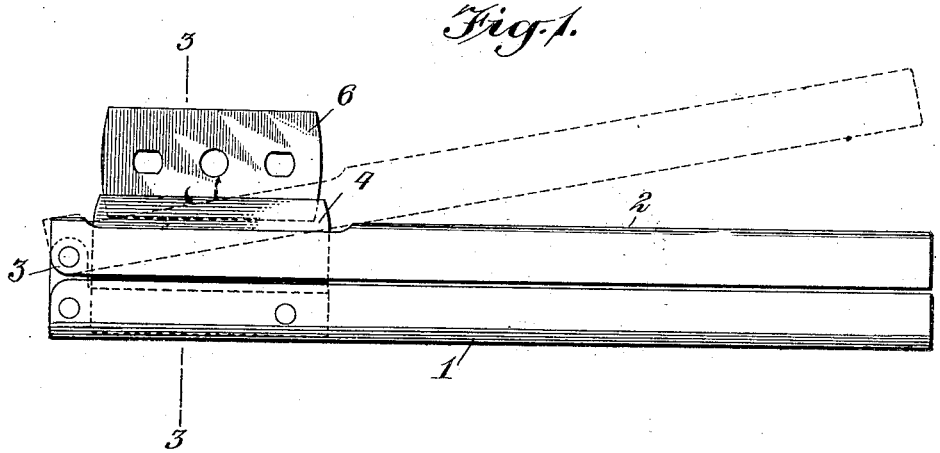
Figure 1 is a side elevation of the device.
Figure 2:
Fig. 2 is a plan view.

The form of the invention shown in the drawings is a preferred form, although it is understood that modifications in the construction and arrangement of the parts and in the character of the materials used may be adopted without departing from the spirit of the invention as set forth in the appended claims.

In general, the invention comprises a pair of pivoted handles in connection with one of which a blade-receiving means is mounted. Associated with the other handle is means adapted when the two handles are drawn together to engage the blade gripping means to tighten its grip on the blade, so that when the handles are drawn close together the blade is very firmly gripped.

More specifically, the invention comprises a pair of pivoted handles on one of which a pair of blade-receiving plates are mounted. These plates are connected, preferably at their lower ends, to the handle portion and converge toward each other along their upper edges. The other handle portion is slotted and provided with side walls which engage the sloping surface of the blade-receiving plate as the two handles are drawn together, whereby the plates are forced close together to effect a tight grip on the blade received therebetween.

Figure 3:
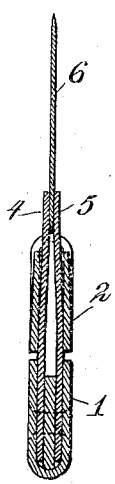
Fig. 3 is a section taken on the line 3—3 of Fig. 1.

The preferred form of the invention shown in the drawings comprises a pair of handle portions 1 and 2 pivoted together at 3, each handle portion being preferably bent into a U-shaped form from one piece of material. A pair of spaced blade-receiving plates 4 and 5 are connected to one of said handle portions 1 along their lower edges, near the pivot point of said handle portion. These plates, as will be understood from Fig. 3, extend forwardly from the handle portion and converge toward each other near their upper edges. A blade 6 is adapted to be received between the upper edges of the plates 4 and 5.

The other handle portion 2 is cut away as at 7 to provide a slot slightly longer than the length of the plates 4 and 5, and this handle portion is thereby provided with side walls 8 and 9. As the handle 2 is drawn down close to the handle portion 1, and the walls 8 and 9 engage the sloping surfaces of the plates 4 and 5 and, by reason of their slope, tend to force the upper edges of said plates together whereby they may more firmly grip the blade 6 therebetween. This action is of the character of a wedging action and is increasingly effective as the handle portion 2 is drawn down closer into abutment with the handle portion 1. To release the blade 6 the handle portion 2 is merely raised away from the handle portion 1 a sufficient distance so that the pressure of the walls 8 is relieved from the surfaces 4 and 5 whereupon the blade 6 can be removed.

It will be seen that this device is extremely simple in its construction, comprising a minimum number of simple parts, and that the operation of the device is equally simple and effective.

What I claim is:—

A razor blade holder, which comprises a pair of pivoted handles, a pair of spaced blade-receiving plates mounted on one handle, said plates converging at their upper edges to receive a blade therebetween, the other handle portion slotted and provided with side walls, said walls adapted when the handles are drawn together to engage the sloping faces of said plates to force said plates together to grip the blade when the handles lie adjacent each other.

PHILIP KILIMNIK.